United States Patent Office 3,759,832
Patented Sept. 18, 1973

3,759,832
FERRITE MATERIAL
Boris Nikolaevich Ermakov, ulitsa Leni Golikova 10, kv. 39, and Viktor Georgievich Kurilenko, nab. r. Fontanki 18, kv. 6, both of Leningrad, U.S.S.R.
No Drawing. Continuation-in-part of abandoned application Ser. No. 748,907, July 31, 1968. This application July 16, 1971, Ser. No. 163,478
Int. Cl. C04b 35/28
U.S. Cl. 252—62.63                3 Claims

ABSTRACT OF THE DISCLOSURE

Ferrite materials having for their basic components ferric oxide and nickel oxide. The ferrite material (ferrite) also includes cobalt oxide and lead oxide, which makes it possible to extend the operational frequency range of the material up to 400M c.p.s. The ferrite has the following composition, by mol. percent:

| | |
|---|---|
| Ferric oxide | 38–48 |
| Lead oxide | 0.5–3.0 |
| Cobalt oxide | 0.7–2.0 |
| Nickel oxide | 50.0–60.8 |

Articles are made from the herein disclosed nickel ferrite including cobalt oxide and lead oxide additives in accordance with the known ceramic industry technology.

CROSS RELATED APPLICATIONS

This application is a continuation-in-part of the application Ser. No. 748,907 filed July 31, 1968, and now abandoned.

BACKGROUND (a) Field of the invention (1) The present invention relates to materials used in radio engineering, operable within a 100 to 400M c.p.s. frequency range.

Prior art (2) There are known in the art nickel ferrites of a stoichiometric composition, containing 50% $Fe_2O_3$ and 50% NiO and having a cubic structure. These ferrites are operative at frequencies below 200M c.p.s. and have magnetic permeabilty $\mu'$ equal to 10 to 12 G/oe. and losses $\mu''$ equal to 6.0 where the term "losses" ($\mu''$) is meant to indicate the imaginary part of complex magnetic permeability ($\mu^* = \mu' - \gamma\mu''$).

At higher frequencies the employment of nickel ferrites is impeded by sharply increasing losses $\mu''$ and decreasing magnetic permeability $\mu'$. Nickel ferrites including cobalt oxide as an additive feature lower losses $\mu'' < 0.3$, but, on the other hand, their magnetic permeability is also lower: $\mu' = 1.5$ to 2.0 G/oe., which makes their use less effective. Moreover, the last-mentioned ferrites exhibit a marked growth of the losses upon being remagnetized in a constant magnetic field.

Thus, ferrites having a hexagonal structure have been hitherto recommendable for use with frequencies ranging from 100 to 400M c.p.s. However, these hexagonal structure ferrites are not free from certain drawbacks, such as increased losses, particularly, with increased intensities of the high-frequency field, as well as complicated manufacture of such ferrites involving, as it does, high baking temperatures, the use of oxygen atmosphere and repeated grinding and baking.

SUMMARY OF THE INVENTION

It is an object of the present invention to provide a ferrite which is capable of operation at frequencies ranging from 100 to 400M c.p.s. under the action of two different fields applied thereto, namely, of a high-frequency field with varying amplitude and of a constant field.

The ferrite, in accordance with the present invention, should have the following characteristics at a frequency of 200M c.p.s.: magnetic permeability $\mu' = 3$ to 7 G/oe. and losses $\mu''$ below 0.3.

It is a further object of the present invention to broaden the range of the operating frequencies of nickel ferrites, to reduce the losses both in weak and strong high-frequency fields without any considerable reduction of the magnetic permeability $\mu'$ thereof and to provide the possibility of effecting cyclic remagnetization of these ferrites in a constant field, which should not be accompanied by any substantial alteration of the value of the losses and that of the magnetic permeability thereof.

The main characteristic feature of the present invention is that the broadening of the operating frequency range and the reduction of the level of losses of nickel ferrites are effected in strong and weak high-frequency fields by the introduction thereto of a cobalt oxide additive in the amount of 0.7 to 2.0% mol.

However, this additive has been found to reduce substantially the magnetic permeability of the ferrites, down to the value of $\mu' = 2$ to 3 G/oe.

It has been found that the introduction of a lead oxide additive in the quantity of 0.5 to 3.0% mol, acting as a flux, steps up the magnetic permeability and thus compensates for the adverse action of the cobalt oxide additive, without increasing the level of losses.

The ferric oxide content being thus non-stoichiometric, i.e. being from 38 to 48% mol. instead of 50% and higher, there is imparted to the material in question an ability to retain the initial level of losses on cyclic remagnetization in a constant field, this ability not being found in ferrites containing 50% mol. and more ferric oxide and a cobalt oxide additive.

A ferrite material in accordance with the present invention includes the following ingredients, in percent mol.:

| | |
|---|---|
| Ferric oxide | 38–48 |
| Lead oxide | 0.5–3.0 |
| Cobalt oxide | 0.7–2.0 |
| Nickel oxide | 50.0–60.8 |

However, it should be noted that in the course of the manufacture of the above, ferrite lead oxide and cobalt oxide may be replaced by various known compounds which decompose upon heating and yield lead oxide and cobalt oxide.

Nickel ferrite articles with cobalt oxide and lead oxide additives are manufactured in compliance with the conventional ceramic industry techniques. The abovementioned components are blended in the desired proportion and dry-mixed in vibratory mills. The mixture thus obtained is baked at 900° C. and then is re-ground in vibratory mills. The ground product is then compressed under a specific pressure of 2000 kg./sq. cm. in the presence of 10% by weight aqueous solution of polyvinyl alcohol as a binding agent. After subsequent drying, the articles are baked at 900° C.–980° C.

DETAILED DESCRIPTION

The present invention will be further described in connection with the preferred embodiments thereof, accompanied by the data obtained by measurements.

treated in the manner described in connection with Example 1, except that the secondary baking temperature was 950° C. The $\mu'$ and $\mu''$ measurements are to be found in the table hereinbelow.

MEASUREMENT DATA TABLE

| Material | Frequency 200M c.p.s. at— | | | | Frequency 300M c.p.s. at H<0.2 oe. | | Frequency 400M c.p.s. at H<0.2 oe. | |
| --- | --- | --- | --- | --- | --- | --- | --- | --- |
| | H<0.2 oe. | | H~=5 oe. | | | | | |
| | $\mu'$ G/oe. | $\mu''$ | $\mu'$ G/oe. | $\mu''$ | $\mu'$ G/oe. | $\mu''$ | $\mu'$ G/oe. | $\mu''$ |
| As in Ex. 1 | 7.0 | .03 | 7.0 | 0.035 | 7.0 | 0.3 | 7.0 | 0.5 |
| As in Ex. 2 | 3.0 | .03 | 3.0 | 0.03 | 3.0 | .03 | 3.0 | .03 |
| As in Ex. 3 | 6.0 | .03 | | | 5.9 | .03 | 6.0 | .03 |
| Ferrite material with hexagonal structure | 8.5 | .17 | | | | | *9.2 | *.73 |

*At 500M c.p.s. frequency.

NOTE.—It has been found impossible to obtain the results of measurements with specimens made of a ferrite material of a hexagonal structure, with the intensity of the high-frequency field H~equal to 5 oe. on account of the sharp growth of the losses.

EXAMPLE 1

Ferric, nickel, cobalt and lead oxides, taken in a proportion corresponding to the following percent mol. composition:

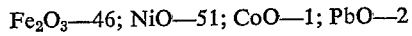

$Fe_2O_3$—46; NiO—51; CoO—1; PbO—2 were mixed in a vibratory mill for one hour, and then the mixture thus obtained was baked for four hours in the ambient air atmosphere at 900° C. After subsequent cooling, the product was again ground in a vibratory mill for one hour.

Then a binding agent was added to the powdered material obtained as a result of the above operations, whereafter ring-shaped articles were pressure-moulded therefrom and baked in the ambient air atmosphere at 960° C. The results of the $\mu'$ and $\mu''$ measurements of the articles obtained are given in the table hereinbelow.

EXAMPLE 2

The mixture of Example 1 was treated in the manner described in connection with Example 1, except that the secondary baking temperature was 900° C.

The $\mu'$ and $\mu''$ measurements are given in the table hereinbelow.

EXAMPLE 3

A mixture of the following percent mol. composition: $Fe_2O_3$—38; NiO—58.75; PbO—2.0; CoO—1.25 was

What we claim is:

1. A ferrite material consisting of ferric oxide, nickel oxide, cobalt oxide and lead oxide, said oxides being present in the following proportion, in mol. percent:

Ferric oxide _____ 38.0–48.0
Cobalt oxide _____ 0.7–2.0
Nickel oxide _____ 50.0–60.8
Lead oxide _____ 0.5–3.0

2. A ferrite material, as claimed in claim 1, wherein the content of ferric oxide is 46.0M mol. percent; nickel oxide 51.0 mol. percent; lead oxide 2.0 mol. percent and cobalt oxide 1.0 mol. percent.

3. A ferrite material, as claimed in claim 1, wherein the content of ferric oxide is 38 mol. percent; nickel oxide 58.75 mol. percent; lead oxide 2.0 mol. percent and cobalt oxide 1.25 mol. percent.

References Cited

UNITED STATES PATENTS 3,450,635  6/1969  Izergina _____ 252—62.63
3,625,898  12/1971  Driessens et al. _____ 252—62.6

FOREIGN PATENTS 1,498,183  9/1967  France _____ 252—62.63

OSCAR R. VERTIZ, Primary Examiner

J. COOPER, Assistant Examiner

U.S. Cl. X.R.

252—62.56